INVENTORS
JOHN W. LAURICELLA
FRANK E. HAGEN
BY Sylvester Sasty
ATTORNEY

Oct. 13, 1953     J. W. LAURICELLA ET AL     2,655,629
CONTROL SYSTEM
Filed June 28, 1949

INVENTORS
JOHN W. LAURICELLA
FRANK E. HAGEN
BY
ATTORNEY

Patented Oct. 13, 1953

2,655,629

UNITED STATES PATENT OFFICE 2,655,629

CONTROL SYSTEM

John W. Lauricella, Passaic, and Frank E. Hagen, Cliffside Park, N. J., assignors to Bendix Aviation Corporation, Teterboro, N. J., a corporation of Delaware Application June 28, 1949, Serial No. 101,818

2 Claims. (Cl. 318—212)

The invention relates to control systems for maintaining a plurality of rotating elements in synchronism in response to electric signals, and more particularly to such systems adapted to control high power output.

In control systems used heretofore having transmitter and receiver inductive devices rotatable with the rotating elements, the output of the receiver, known as the error signal, is amplified and impressed on a motor field, and the rotor of the motor is connected mechanically to the receiver rotor and drives it to null position, that is, until the error signal is zero. The efficiency of the system is determined by the error signal amplifier, and the torque delivered by the motor is limited by the power of the amplified error signal.

One object of the invention is to connect the motor directly to a power source, and to automatically control the voltage impressed on the motor so as to rotate the motor in one direction or the other in response to an error signal, so that the speeds and angular positions of a plurality of rotating elements may be accurately synchronized with one another.

Another object is to provide a control device for dynamically synchronizing a plurality of rotating elements exerting substantial torque.

Another object is to provide a control system in which the power output is relatively high and with less power loss than control systems used heretofore.

Another object is to provide an efficient control system which requires only a relatively small amount of power for its operation, yet controls relatively high power output.

Another object is to provide a simple and relatively inexpensive system for automatically controlling high power output.

Another object is to provide a manual control which renders inoperative the automatic control and connects the motor to the power source for relative rotation of the rotating elements should the inductive devices be 180° or more out of phase.

The invention contemplates impressing an error signal on a phase conscious power amplifier which selectively operates one of a pair of circuit closing devices to connect a drive motor, for synchronizing the rotating elements, directly to a power source for rotation in one direction or the other as determined by the circuit closing device operated.

If the inductive devices are 180° or more out of phase, a manual control is provided to render inoperative the phase conscious power amplifier and to connect the motor to the power source so that the motor rotates in one direction or the other, as determined by the manual control, and rotates the rotating elements relative to one another.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for purposes of illustration and description only, and are not to be construed as defining the limits of the invention, reference being had for this purpose to the appended claims.

In the drawings, Figure 1 is a schematic circuit diagram showing the present invention embodied in a control system provided with a two-phase motor.

Figure 1:
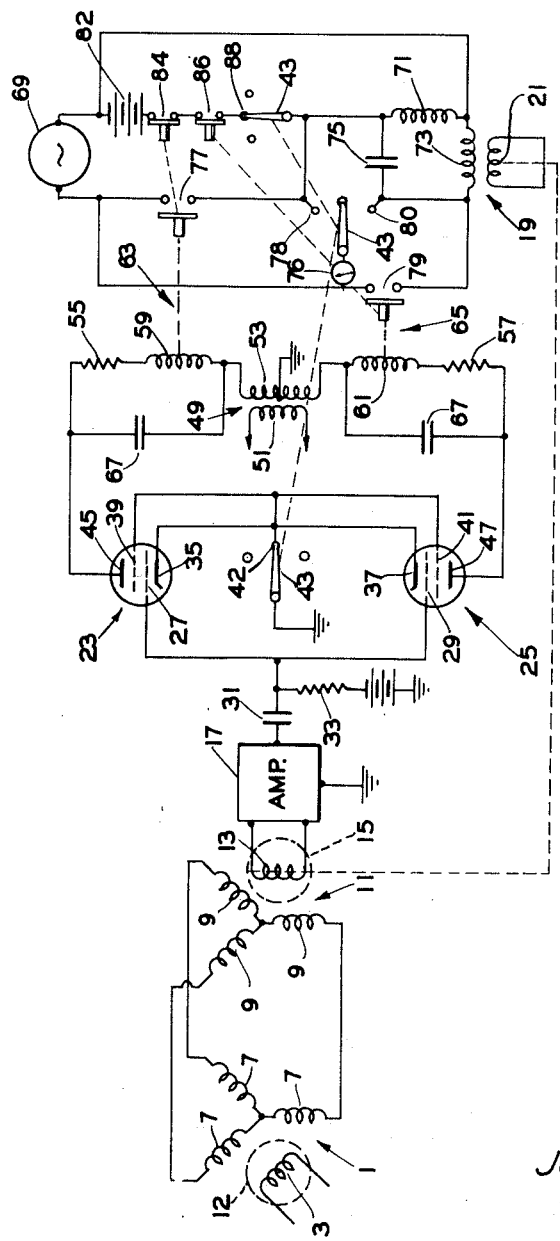

In Figure 1, a transmitter inductive device 1 includes a single rotor winding 3 and three stator windings 7 connected electrically to three associated stator windings 9 of a receiver inductive device 11. The rotor winding 3 of the transmitter inductive device 1 may be drivably connected to a rotating element 12, such as a conveyor belt drive, and the rotor winding 13 of receiver inductive device 11 may be drivably connected to another rotating element 15 which is to be maintained in synchronism with rotating element 12. When rotor windings 3 and 13 are not in agreement with one another, an error signal voltage develops across rotor winding 13. When rotor windings 3 and 13 are in agreement, then substantially no voltage is induced in rotor winding 13. By agreement between the transmitter and receiver rotor windings is meant the relative positions of the windings wherein the receiver rotor winding is in non-inductive relation to the direction of the maximum resultant field produced by receiver stator windings 9.

The error signal is amplified preferably by a two-stage amplifier 17 and the amplified error signal is impressed on an automatic control unit for controlling rotation of a motor 19 having its rotor 21 associated with receiver rotor 13 to return it to null position, that is, until the error signal is zero.

The control unit includes a phase conscious power amplifier provided with a pair of thyratron gas-filled tubes 23, 25 each having its control grid 27, 29 connected through a D. C. blocking and A. C. coupling condenser 31 to amplifier 17. A negative bias is impressed on grids 27, 29 through a grid leak resistor 33. The cathodes 35, 37 and secondary grids 39, 41 of tubes 23, 25 are connected through a contact 42 of a manually operated switch 43 to ground. The plates 45, 47 of tubes 23, 25 are connected to an alternating current source by a transformer 49 having a primary winding 51 and a secondary winding 53. The midpoint of the secondary winding 53 is connected to ground. Current limiting resistors 55, 57, and inductive coils 59, 61 of relays 63, 65 are connected in series with plates 45, 47 and transformer secondary winding 53. A filter condenser 67 is connected in parallel with each current limiting resistor and relay inductive coil to smooth out pulsating currents and prevent chattering of the associated relay contacts 77, 79.

An alternating power source 69 is connected to one end of each field winding 71, 73 of motor 19 and a phasing condenser 75 is connected to the opposite end of each field winding. The end of winding 71 adjacent phasing condenser 75 is connected through normally open contact 77 of relay 63, and through contact 78 of manually operated switch 43 in parallel therewith, to power source 69. Also, the end of field winding 73 adjacent phasing condenser 75 is connected through normally open contacts 79 of relay 65, and through contact 80 of manually operated switch 43 in parallel therewith, to power source 69. Winding 71 is connected in series with a direct current source 82 and with normally closed relay contacts 84 of relay 63, normally closed relay contacts 86 of relay 65 and contact 88 of manually operated switch 43.

When relay 63 is energized, contacts 77 close and connect motor 19 to alternating power source 69, contacts 84 open and disconnect the motor from the direct current source, and the motor rotor rotates in one direction. When relay 65 is energized, contacts 79 close and connect motor 19 to alternating power source 69, contacts 86 open and disconnect the motor from the direct current source, and the motor rotor rotates in the opposite direction. When relays 63 and 65 are de-energized, direct current source 82 is connected across field winding 71 and overcomes hunting by rapidly dissipating the kinetic energy of the motor, and the motor then remains at rest until one or the other of the relays 63, 65 is again energized.

Figure 2:
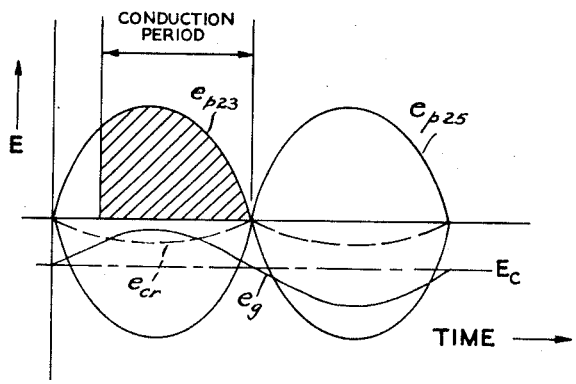
Figure 2 is a graph showing plate and grid voltages in the phase conscious power amplifier plotted against time.

In Figure 2, instantaneous plate voltages on tube 23 are indicated by the sine curve $e_{p23}$, and instantaneous plate voltages on tube 25 are indicated by the sine curve $e_{p25}$. $E_c$ indicates the grid bias on tubes 23, 25. The instantaneous voltage on both grids when an error signal is impressed on the grids is indicated by the sine curve $e_g$.

For a given positive plate voltage, a minimum grid voltage $e_{cr}$ is necessary to fire the tube. When the grid voltage is below the minimum value $e_{cr}$, current will not flow between the plate and cathode. When the grid voltage is above the minimum value, then current flows between the plate and cathode and the magnitude of the current is determined primarily by the external resistance of the plate circuit. In the usual commercial thyratron, once current flow commences between the plate and cathode, then the grid exerts no further control until the plate voltage is reduced to substantially zero, whereupon current flow between the plate and cathode ceases, and if the grid is sufficiently negative, current flow will not begin again. Thus, the grid regains control once during each cycle.

The operation of the device may be readily understood by referring to Figures 1 and 2. The amplified error voltage is fed to grids 27, 29 of tubes 23, 25 as indicated by curve $e_g$. If the grid voltage is in phase with the plate voltage of tube 23 (as shown in Figure 2), tube 23 will conduct every half cycle, as indicated by the shaded area, and energize relay 63 to rotate motor 19 in one direction. Filter condenser 67 provides for current drain through relay 63 on alternating half cycles also, and prevents chattering of the relay contacts. If the grid voltage is in phase with the plate voltage of tube 25, then relay 65 will be energized to rotate motor 19 in the opposite direction. Grid bias $e_c$ is always below $e_{cr}$ and when the error signal is substantially zero, neither relay will be energized and the motor will remain at rest. The contacts of only one relay will close at any time because only one tube will fire at any time.

Rotors 3, 13 of induction devices 1, 11 may synchronize 180° or more out of phase when starting, or due to power failure. To correct this condition, manually operated switch 43, shown in Figure 1, is provided to render inoperative the automatic control system and to operate motor 19 to bring rotors 3, 13 into phase.

Upon operating the manual switch 43, contact 42 is opened and both cathodes 35, 37 are disconnected from ground, contact 88 is opened and field winding 71 is disconnected from direct current source 82, and motor 19 is connected to alternating power source 69 through contacts 78 or 80, as determined by operation of the switch for rotation of the motor in one direction or the other. A rectifier and zero scale milliammeter 76 may be connected in series with contacts 78, 80 to indicate the direction of motor rotation.

Figure 3:
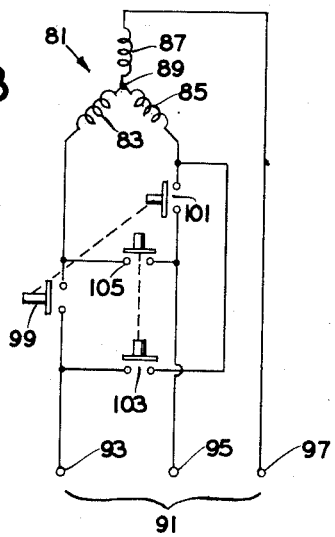
Figure 3 is a schematic circuit diagram corresponding to the right-hand end of Figure 1 and showing the circuit arrangement for a three-phase motor.

In Figure 3, the system described above controls a three-phase motor 81 including field windings 83, 85, 87 connected together in three-phase relation at 89 and connected to a three-phase power source 91 having terminals 93, 95, 97. Relay contacts 99 are interposed between terminal 93 and winding 83, and relay contacts 101 are interposed between terminal 95 and winding 85. Relay contacts 99 and 101 close when relay coil 59 (Figure 1) is energized. Also, field winding 85 is connected to terminal 93 through contacts 103 and field winding 83 is connected to terminal 95 through relay contacts 105. Relay contacts 103 and 105 are closed when relay coil 61 (Figure 1) is energized. With the arrangement described, the phase relation of the voltages impressed on windings 83 and 85 may be changed so as to reverse rotation of the motor.

Figure 4:
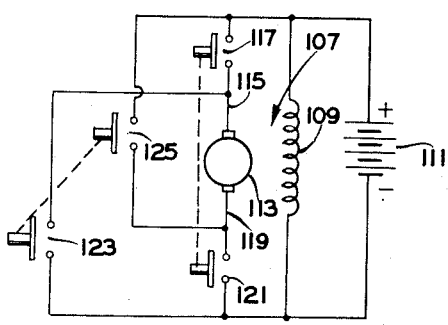
Figure 4 is a schematic circuit diagram similar to Figure 3, but showing the wiring arrangement for a direct current motor.

In Figure 4, a direct current motor 107 is controlled by the system described above. The motor includes a field winding 109 connected in series with a direct current source 111 and an armature 113 in parallel with field winding 109 and having one side 115 connected through relay contacts 117 to the positive side of the source, and having its opposite side 119 connected through relay contacts 121 to the negative side of the source.

Relay contacts 117, 121 close when relay coil 59 (Figure 1) is energized, and current flows through armature 113 in one direction for rotation of the armature in a corresponding direction. Also, armature 113 is connected at its side 115 through contacts 123 to the negative side of the source and at its side 119 through contacts 125 to the positive side of the source. Contacts 123, 125 are operated when relay coil 61 (Figure 1) is energized and current flows through the armature in the opposite direction for rotation of the armature in the opposite direction.

The control system described may be used for synchronizing continuously rotating elements, or for synchronizing intermittently rotating elements. The control system is more efficient, simpler and cheaper than corresponding control systems used heretofore, and may be used to control high power which is limited only by the power source. The rotating devices are accurately synchronized by the control system and should the induction devices be synchronized 180° out of phase, as in starting or due to power failure, a manual control renders inoperative the automatic control and provides for relative rotation of the rotating elements in one direction or the other.

Although but a single automatic control has been illustrated and described in detail, it is to be expressly understood that the invention is not limited thereto. Various changes can be made in the design and arrangement of parts without departing from the spirit and scope of the invention as will now be understood by those skilled in the art. For a definition of the limits of the invention reference will be had primarily to the appended claims.

What is claimed is:

1. In combination, a motor having a pair of field windings connected in parallel with one another and in series with a power source, a phasing condenser connected across said windings, a first relay having contacts connected in series with one of said field windings and with the power source, a second relay having contacts connected in series with said other field winding and with the power source, a phase conscious power amplifier including a pair of thyratron gas tubes responsive to error signals and adapted to energize said relays one at a time for operation of said motor in one direction or another, and an anti-hunt circuit including a direct power source connected in series with one of the field windings, said relays having normally closed contacts connected in series with said one field winding and said direct power source and adapted to open when said relays are energized.

2. In combination, a motor, a first relay having contacts connecting said motor to an alternating power source for operation in one direction, a second relay having contacts connecting said motor to the power source for operation in the opposite direction, a phase-conscious amplifier including a pair of thyratron gas tubes responsive to error signals and adapted to energize said relays one at a time for operation of said motor in one direction or another, and an anti-hunt circuit including a direct power source connected to said motor, said relays having normally closed contacts connecting said motor to said direct power source and adapted to open when said relays are energized.

JOHN W. LAURICELLA.
FRANK E. HAGEN.

References Cited in the file of this patent

UNITED STATES PATENTS

| Number | Name | Date |
| --- | --- | --- |
| 1,800,303 | Lindsay | Apr. 14, 1931 |
| 1,942,587 | Whitman | Jan. 9, 1934 |
| 1,959,805 | Whittkuhns et al. | May 22, 1934 |
| 1,960,350 | Shackleton et al. | May 29, 1934 |
| 2,089,826 | Cunningham | Aug. 10, 1937 |
| 2,297,187 | Johnson | Sept. 29, 1942 |
| 2,331,698 | Keeler | Oct. 12, 1943 |
| 2,334,704 | Hilferty | Nov. 23, 1943 |
| 2,363,791 | Holden | Nov. 28, 1944 |
| 2,414,936 | Edwards et al. | Jan. 28, 1947 |
| 2,427,813 | Roby et al. | Sept. 23, 1947 |
| 2,454,401 | Nygaard | Nov. 23, 1948 |